United States Patent

[11] 3,575,600

| [72] | Inventors | George J. Trachevski;<br>Juan H. Crawford, Dublin, Ohio |
|---|---|---|
| [21] | Appl. No. | 725,636 |
| [22] | Filed | May 1, 1968 |
| [45] | Patented | Apr. 20, 1971 |
| [73] | Assignee | Industrial Nucleonics Corporation |

[54] NUCLEONIC GAUGES WITH TRAVERSING HEADS, AND DRIVE THEREFOR
4 Claims, 4 Drawing Figs.

[52] U.S. Cl. ..................................................... 250/83, 250/83.3, 250/92
[51] Int. Cl. ..................................................... G01f 1/00, G01f 7/00
[50] Field of Search ........................................... 250/83.3 (D), 92, 83

[56] References Cited
UNITED STATES PATENTS

| 2,518,884 | 8/1950 | Guentner et al. ............... | 250/92X |
| 3,125,680 | 3/1964 | Schlaechter ..................... | 250/83.3D |
| 3,254,223 | 5/1966 | Koerner et al. ................. | 250/92 |

*Primary Examiner*—Archie R. Borchelt
*Attorneys*—Marechal, Biebel, French and Bugg, William T. Fryer, III, C. Henry Peterson and James J. O'Reilly ABSTRACT: An enclosed O-bracket type traversing system for nucleonic or radioactive gauging apparatus includes a flexible tension member interconnected with the source and detector heads to form an endless loop for accurate maintenance of registration and alignment throughout the range of traversing movement.

PATENTED APR 20 1971 3,575,600

INVENTORS
GEORGE J. TRACHEVSKI &
JUAN H. CRAWFORD
BY
Marechal, Biebel, French & Bugg
ATTORNEYS

NUCLEONIC GAUGES WITH TRAVERSING HEADS, AND DRIVE THEREFOR

BACKGROUND OF THE INVENTION

Industrial processes frequently require the continuous measurement of physical qualities of a sheetlike material, such as paper, strip steel, or plastic materials, formed in either sheet or continuous web form. Frequently, the width in transverse direction of the material being monitored is relatively great. When noncontacting nucleonic or radioactive sources and detectors are used in such measurements, a radioactive source is mounted in a head and a detector is mounted in an opposed head. The heads are moved or traversed together along opposite sides of the web or sheet during measurement. For this purpose, wide brackets, such as O-type brackets are frequently employed, such as shown in the U.S. Pat. Nos. 3,125,680 of 1964, D184,834 of 1959 to Schlaechter D183,212, D183,213 and D183,312 of 1958 to Holben, all assigned to the same assignee as this invention.

The highly accurate sensing and measuring operation requires that the source head and detector head be traversed together while maintaining a condition of accurate alignment and registration throughout the range of the traversing movement. This requires a head drive mechanism which is adapted to maintain accurate alignment. A common type of drive as consisted of a separate chain loop for each of the two heads, driven by a common drive shaft which operates to synchronize the two chains. While this system has been successful, it has involved certain difficulties, particularly in wide widths. The chains tend to stretch an unequal amount, causing a loss of head registration accuracy. Uneven tension in the chains results in uneven tensile forces within the frame work, resulting in a polygonal deformation which may, in severe cases, cause difficulty in head movement and create alignment problems. Further, the chains tend to wear unevenly, thus affecting the alignment of one of the heads relative to the other.

Other transducers employing radiant or penetrating radiation such as infrared or microwave are adversely affected by misalignment of source and detector heads. Reference may be had to a copending application, Ser. No. 556,224, for H. J. Evans and W. H. Cornetet, Jr., filed Jun. 8, 1966 now U.S. Pat. No. 3,460,031, and commonly assigned with this invention for a description of a microwave moisture gauge. As with the nucleonic radiation gauge, very little movement of the microwave source and detector heads may be tolerated. Infrared gauges are employed to measure material component weight, moisture content of products, such as, for example, paper sheet. Improper alignment of the IR source and detector heads may be avoided by use of the structure disclosed herein.

SUMMARY OF THE INVENTION

The present invention utilizes a flexible member interconnecting each of the two radiant energy gauging heads in an endless loop for simultaneous movement. By the use of a flexible member connected to form an endless loop, a constant and common tension may be applied throughout. The problem of uneven wear is substantially reduced since each head tends to be affected the same by friction or wear. The employment of a flexible member interconnecting the heads into an effective closed loop of defined and constant length results in a more simplified drive mechanism, which is inherently less prone ro alignment problems once the heads are brought into initial registration. Since the closed loops defined by the heads and the flexible member has a relatively uniform tension throughout, it can be expected that maintenance of alignment may be simplified throughout the entire width of traversing movement.

The invention has the further advantage of providing a structure in which tension and/or friction can conveniently be interposed into the loop in order to balance any uneven or nonuniform tendencies due to uneven friction in the loop. Additionally, while sprocket chains may conveniently be used as the flexible member, it is preferred to use a simpler drive element, less prone to wear and stretch problems, such as a steel cable or a steel tape. Some drive slippage can thus be tolerated since it does not result in misalignment of the heads.

It is accordingly an important object of the invention to provide, in a gauging mechanism, a flexible member connected to the source and detector heads in endless manner for causing these heads to move together concurrently with high accuracy of registration throughout the traversing movement.

A more specific object of the invention is the provision, in an O-bracket type of head mounting and support arrangement, of interconnected loops of a flexible drive member, such as a steel tape or cable, in which portions of the member are run or threaded within the hollow guide tubes supporting the heads.

A still further object of the invention is the provision of a simplified drive mechanism for a nucleonic gauge traversing structure in which the drive elements are formed of relatively low cost and dependable materials, while providing for accurate registration of the heads throughout the traversing movement.

These and other objects and advantages of the present invention will be apparent from the following description, the accompanying drawings and the appended claims.

DESCRIPTION OF PREFERRED EMBODIMENT

Figure 1:
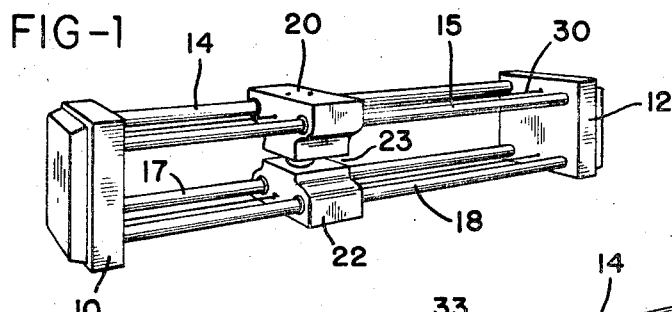
FIG. 1 is a perspective view of an O-bracket traversing nucleonic gauge system constructed according to this invention.

Referring to the FIGS. of the drawing which illustrate a preferred embodiment of the invention, a nucleonic gauge measuring system for measuring a physical quality of sheet material is shown in FIG. 1 as including a pair of spaced apart stanchions 10 and 12 positioned and supported on opposite sides of the sheet or web to be measured. The stanchions 10 and 12 are interconnected, in this embodiment, by a plurality of hollow tubes defining a pair of upper tubes 14 and 15 which extend in parallel, spaced-apart relationship between the stanchions 10 and 12. Similarly, a pair of lower tubes 17 and 18 extend in parallel, spaced-apart relation between the respective stanchions. The tubes, as shown by the end views in FIGS. 3 and 4, may be arranged in a generally rectangular relation to each other, although any other suitable geometric relation may be employed in accordance with the design parameters of the heads and of material being monitored.

The tubes 14 and 15 comprise guide means for mounting and supporting a detector head 20 for traversing movement between the stanchions 10 and 12. The head 20 may thus be formed with internal low-friction guide bearings, not shown, and received in sliding relation on the outer surfaces of the tubes 14 and 15 which thereby comprise guide ways for the head 20. In a similar manner, a source head 22 is mounted for traversing movement on the tubes 17 and 18, and defines with the head 20 an intermediate space 23 through which the web or sheet of material passes while being monitored or measured. For further details of radiant energy gauging systems reference may be had either to the above-mentioned U.S. Pat. No. 3,125,680 or to the copending Evans et al. application.

Figure 2:
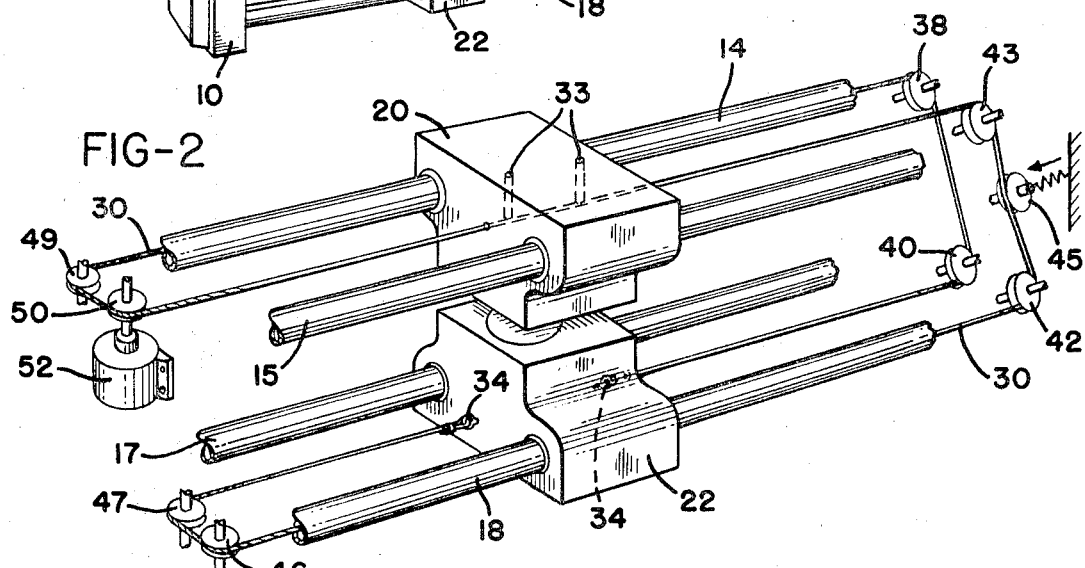
FIG. 2 is an enlarged fragmentary perspective view of the traversing system.

The invention includes an elongated flexible drive member 30 of a defined or definite length for interconnecting the heads 20 and 22 into a continuous loop for concurrent traversing movement. The member 30 may be a steel cable, a flexible tape, a sprocket chain, or any other suitable substantially nonstretching, tension-carrying flexible member. The member 30 forms a closed loop with the heads 20 and 22, and may pass through the head, as shown in FIG. 2 in the case of the detector head 20 where it is secured by set screws 33. Also, it may be connected as shown in the case of the source head 22 by eyebolts 34 to the left and right sidewalls of the head.

The member 30, as shown in FIG. 2, is threaded or formed in two runs, one run for each of the heads, extending transversely between the stanchions 10 and 12. The runs each comprise two lengths of the flexible member 30. The upper run is associated with the head 20 while the lower run is associated with the head 22. Preferably, the connections between the flexible member 30 and the heads are made at points or locations midway between the respective support tubes in order to reduce rotative or sideways loads on the heads. The return lengths may be conveniently carried through the center of one of the tubes, so that the member 30 is partially concealed and is thereby at least partially isolated from contamination.

Figure 3:
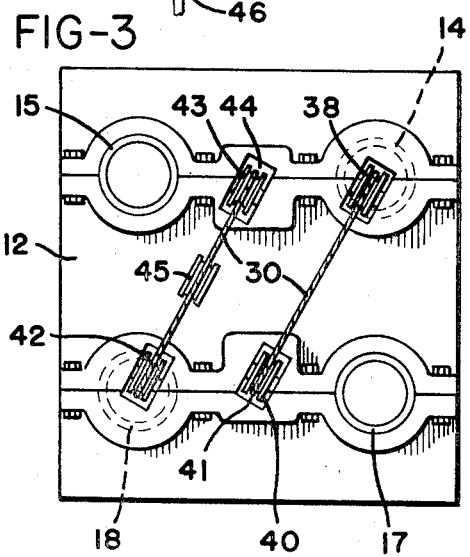
FIG. 3 is an enlarged end view of one of the stanchions, with the cover removed, showing the routing of the flexible member at the nondriving end.
Figure 4:
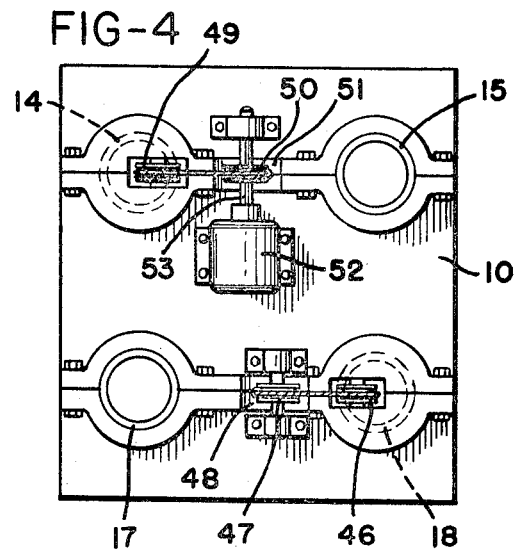
FIG. 4 is a view similar to FIG. 3 of the opposite end stanchion with the cover removed and showing the routing of the flexible member at the drive end.

Referring further to FIGS. 3 and 4, it will be seen that the right-hand stanchion supports a free-turning sheave 38, which is oriented over the end of the tube 14, to direct the member 30 at an angle down to a further sheave 40 which directs the bottom length of the member 30 through an opening 41 to the right-hand side of the source head 22. The stanchion 12 supports a further sheave 42 which directs the member 30 from within the tube 18 diagonally upwardly to a sheave 43, where the member 30 runs outwardly through a further opening 44 to the right-hand side of the detector head 20. A biased or spring-loaded pulley 45 may be applied to the run of the member 30 at any convenient point, such as between the sheaves 42 and 43, as shown in FIGS. 2 and 3, for the purpose of taking up slack and providing a uniform tension throughout the length of the member 30. Also, the pulley 45 may be used for adding friction at some point in the system if this becomes desirable in order to provide for more uniform tracking of the heads by balancing the overall friction.

The left-hand stanchion 10 may be provided with a sheave 46 positioned to receive the member 30 as it exits from the opposite end of the tube 18, and direct the flexible member to a sheave 47 for extension through an opening 48 to the left-hand side of the head 22. A similar sheave 49 may be mounted over the open end of the tube 14 to direct the member 30 to a drive sheave 50 and through an opening 51 to the left-hand side of the detector head 20. Drive means for the flexible member 30 may conveniently consist of a gear reduction motor 52 having its shaft 53 connected in driving relation to the sheave 50.

Since the flexible member 30 is maintained in tension throughout, it may be driven in translation at any convenient point throughout its length, such as at the sheave 50, to effect the simultaneous traversing movement of each of the heads which are connected in the closed loop. Uneven tension in the O-bracket is eliminated since the same tension is applied throughout. The necessity for using a roller chain with sprocket drive is eliminated since some slippage can be tolerated as slippage does not affect the alignment of the heads.

While a cable member 30 has been shown, it is within the scope of the invention to use a smooth steel tape. In some instances, a tape may be preferred since it may readily be wiped or scraped clean to reduce accumulation of dirt which may otherwise tend to build up and reduce the accuracy of registration. In addition, the threading of one run in each of the two loops formed by the member 30 within the tubular structure, and the placement of the sheaves within enclosed stanchions, shields much of the drive from the accumulation of foreign matter.

The operation of the traversing system of this invention is self-evident from the foregoing description. It will be seen that translatory movement imparted to the flexible member 30 will result in corresponding movement of each of the heads 20 and 22 by an equal amount, in the same direction. If desired, known threaded cable adjusting devices may be employed at the points at which the flexible member join with the heads, for assisting in initial alignment. Further, integral spring-type tension units may be employed at either end of the flexible member at either head for imparting an internal constant tension to the flexible member, either in lieu of, or in addition to that imparted by the spring or force loaded pulley 45. Also, one or more of the sheaves received within the stanchions 10 or 12 may be shimmed, or biased by a threaded member, for taking up slack and imparting tension.

While the form of apparatus herein described constitutes a preferred embodiment of the invention, it is to be understood that the invention is not limited to this precise form of apparatus, and that changes may be made therein without departing from the scope of the invention which is defined in the appended claims.

We claim:

1. A gauge-traversing system for assuring accurate registration between a source head and a detector head throughout the range of their traversing movement, comprising guide means mounting said heads in superimposed spaced relation and defining a pair of transverse parallel paths along which said heads may be moved in said traversing movement, flexible interconnecting tension means of a defined length joining said heads together in an endless closed loop for concurrent movement and being formed with a pair of transversely oriented loop portions with one each of said heads being connected in one run of each of said loop portions, and means for imparting translatory movement to said flexible means to effect said traversing movement of said heads.

2. The traversing system of claim 1 including roller means for applying a tension force to said flexible means.

3. A gauge-traversing system for assuring accurate registration between one gauging head including a source of penetrating radiation and a radiation detector head throughout the range of their traversing movement, comprising guide means mounting said heads in superimposed spaced relation and defining a pair of transverse parallel paths along which said heads may be moved in said traversing movement, elongated flexible tension means of substantially constant length interconnecting said heads formed in a closed loop and defining the sole motivating connection between said heads so that translatory movement of said tension means effects concurrent traversing moving of each of said heads in the same direction by the same amount, and means for imparting translatory movement to said flexible tension means.

4. A nucleonic gauge-traversing system for assuring accurate registration between a radioactive source head and a detector head throughout the range of their traversing movement, comprising a pair of spaced apart stanchions, rigid tube means extending between said stanchions defining a traversing way, means mounting said heads for traversing guided movement on said tube means, an elongated flexible drive member of a defined length connected in a closed loop including each of said heads, means maintaining said loop in tension, said loop being formed in first and second runs with each run comprising two lengths of said member extending transversely between said stanchions sheave means in each of said stanchions supporting each run of said member, one length of each of said runs being received within said tube means and the other length of each of said runs engaging the associated one of said heads, and drive means for imparting translatory movement to said member.